(12) United States Patent
Song et al.

(10) Patent No.: US 8,310,782 B2
(45) Date of Patent: Nov. 13, 2012

(54) DEDICATED ID-OD WRITER WITH BEVELED POLE TIPS AND METHOD OF MANUFACTURE

(75) Inventors: Dian Song, Eden Prairie, MN (US);
Huaqing Yin, Eden Prairie, MN (US);
Ralph William Cross, Lyons, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1258 days.

(21) Appl. No.: 12/098,114

(22) Filed: Apr. 4, 2008

(65) Prior Publication Data

US 2009/0251821 A1    Oct. 8, 2009

(51) Int. Cl.
*G11B 5/187* (2006.01)
*G11B 5/29* (2006.01)

(52) U.S. Cl. ............... 360/121; 360/125.04; 360/125.05; 360/125.09; 360/125.3

(58) Field of Classification Search .................. 360/121, 360/125.04, 125.05, 125.09, 125.3
See application file for complete search history.

(56) References Cited

U.S. PATENT DOCUMENTS

| | | | |
|---|---|---|---|
| 4,303,956 A | 12/1981 | Kobubu et al. | |
| 4,484,238 A | 11/1984 | Vinal | |
| 4,782,415 A | 11/1988 | Vinal | |
| 4,799,115 A | 1/1989 | Rogers et al. | |
| 5,010,430 A * | 4/1991 | Yamada et al. | 360/235.4 |
| 5,359,482 A | 10/1994 | Juncker | |
| 5,737,826 A * | 4/1998 | Slade et al. | 29/603.15 |
| 5,781,378 A | 7/1998 | Heitkamp et al. | |
| 5,790,341 A | 8/1998 | Cunningham et al. | |
| 5,801,910 A | 9/1998 | Mallary | |
| 5,920,447 A * | 7/1999 | Sakata et al. | 360/121 |
| 6,313,969 B1 * | 11/2001 | Hattori et al. | 360/135 |
| 6,482,575 B2 | 11/2002 | Tokai et al. | |
| 6,504,675 B1 | 1/2003 | Skukh et al. | |
| 6,710,973 B2 | 3/2004 | Okada et al. | |
| 6,717,770 B1 * | 4/2004 | Crawford | 360/123.11 |
| 6,754,947 B2 | 6/2004 | Stageberg et al. | |
| 6,813,116 B2 | 11/2004 | Nakamura et al. | |
| 6,891,697 B2 | 5/2005 | Nakamura et al. | |
| 6,954,340 B2 | 10/2005 | Shukh et al. | |
| 6,965,494 B2 * | 11/2005 | Campbell et al. | 360/125.04 |
| 6,995,949 B2 | 2/2006 | Nakamura et al. | |
| 7,006,326 B2 | 2/2006 | Okada et al. | |
| 7,012,775 B2 * | 3/2006 | Suzuki et al. | 360/75 |
| 7,031,121 B2 | 4/2006 | Khera et al. | |
| 7,075,756 B1 | 7/2006 | Mallary et al. | |
| 7,100,266 B2 | 9/2006 | Plumer et al. | |
| 7,186,348 B2 | 3/2007 | Chen et al. | |

(Continued)

OTHER PUBLICATIONS

M. Mallary, "Recording Head Design," from The Physics of Ultra-High-Density Magnetic Recording, (M. L. Plumer et al., eds.) (2001) pp. 314-347, plus title pages.

*Primary Examiner* — Jefferson Evans
(74) *Attorney, Agent, or Firm* — Hall Estill Attorneys at Law

(57) ABSTRACT

A transducing head for use with a storage medium rotatable about an axis includes first and second writers for writing to the storage medium. The first writer is configured for dedicated writing to a first radial region of the storage medium, and the second writer is configured for dedicated writing to a second radial region of the storage medium. The second radial region is located radially outward from the first radial region.

22 Claims, 11 Drawing Sheets

U.S. PATENT DOCUMENTS

| | | | |
|---|---|---|---|
| 7,215,512 B2 * | 5/2007 | Yazawa et al. | 360/125.46 |
| 7,233,457 B2 * | 6/2007 | Johnston et al. | 360/125.04 |
| 7,280,314 B2 | 10/2007 | Gill et al. | |
| 7,296,338 B2 | 11/2007 | Le et al. | |
| 7,324,304 B1 | 1/2008 | Benakli et al. | |
| 7,394,619 B2 * | 7/2008 | Nikitin | 360/118 |
| 7,508,619 B2 * | 3/2009 | Okamoto et al. | 360/76 |
| 7,522,378 B2 * | 4/2009 | Im | 360/125.12 |
| 7,876,531 B2 * | 1/2011 | Bozeman et al. | 360/136 |
| 2002/0131203 A1 * | 9/2002 | Litvinov et al. | 360/125 |
| 2004/0264062 A1 | 12/2004 | Price et al. | |
| 2005/0066517 A1 | 3/2005 | Bedell et al. | |
| 2006/0028762 A1 | 2/2006 | Gao et al. | |
| 2006/0152850 A1 * | 7/2006 | Hsu et al. | 360/125 |
| 2007/0035878 A1 | 2/2007 | Guthrie et al. | |
| 2007/0183093 A1 | 8/2007 | Le et al. | |
| 2007/0188921 A1 | 8/2007 | Mochizuki et al. | |
| 2007/0211382 A1 | 9/2007 | Mochizuki et al. | |
| 2007/0223140 A1 | 9/2007 | Hirabayashi et al. | |
| 2007/0230044 A1 * | 10/2007 | Han et al. | 360/125 |
| 2007/0231523 A1 | 10/2007 | Ohmi et al. | |
| 2007/0236834 A1 | 10/2007 | Toma et al. | |
| 2007/0247752 A1 | 10/2007 | Otagiri et al. | |
| 2007/0253107 A1 | 11/2007 | Mochizuki et al. | |
| 2007/0285835 A1 | 12/2007 | Sun et al. | |
| 2008/0002292 A1 | 1/2008 | Le et al. | |
| 2008/0002309 A1 | 1/2008 | Hsu et al. | |
| 2008/0019045 A1 | 1/2008 | Otagiri et al. | |
| 2008/0055784 A1 | 3/2008 | Shimazawa et al. | |
| 2009/0251823 A1 * | 10/2009 | Jang | 360/234.6 |

* cited by examiner

DEDICATED ID-OD WRITER WITH BEVELED POLE TIPS AND METHOD OF MANUFACTURE

BACKGROUND

The present invention relates to transducing heads for use with magnetic recording media systems, such as hard disc drives (HDDs), and corresponding methods of manufacture.

HDDs typically comprise one or more magnetic media discs, each disc having concentric data tracks for storing data. Where multiple discs are used, a stack is formed of co-axial discs having generally the same diameter. A transducing head carried by a slider is used to read from and write to a data track on a disc. The slider is carried by a head arm assembly (HAA) that includes an actuator arm and a suspension assembly, which can include a separate gimbal structure or can integrally form a gimbal. During operation, as the disc spins, the slider glides above the surface of the disc on a small cushion of air. The actuator arm pivots to movably position the slider with respect to the disc. A microactuator assembly can be included to provide additional precision positioning of the suspension assembly. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

The transducing head typically includes a single writer and a single reader. The reader includes a sensor for retrieving magnetically encoded information stored on the disc (or other magnetic storage media). Magnetic flux from the surface of the disc causes rotation of the magnetization vector of a sensing layer or layers of the sensor, which in turn causes a change in the electrical properties of the sensor that can be detected by passing a current through the sensor and measuring a voltage across the sensor. Depending on the geometry of the sensor, the sense current may be passed in the plane (CIP) of the layers of the sensor or perpendicular to the plane (CPP) of the layers of the sensor. External circuitry then converts the voltage information into an appropriate format and manipulates that information as necessary to recover information encoded on the disc.

The writer, for a perpendicular recording transducing head, typically consists of a main pole and a return pole, which are separated from each other at an air bearing surface (ABS) of the transducing head by a gap layer. The main pole and return pole are connected to each other at a region distal from the ABS by a back gap closer or back via. One or more layers of conductive coils are positioned between the main and return poles, and are encapsulated by insulating layers. The conductive coils can have different configurations, such as helical and pancake configurations. To write data to the disc (or other magnetic media), an electric current is applied to the conductive coils to induce a magnetic field in the disc under a pole tip of the main pole. By reversing the direction of the current through the coils, the polarity of the data written to the magnetic media is reversed, and a magnetic transition is written between two adjacent bits. Because the main pole is generally the trailing pole of the main and return poles, the main pole is used to write the data to the magnetic media.

The slider includes a slider body (typically called the "substrate") and an overcoat that includes the transducing head. The overcoat is electrically insulative. A plurality of bond pads are formed at a side or edge of the slider, typically at its trailing edge, for electrically connecting elements of the transducing head to external circuitry through the overcoat. There are generally two bond pads for the writer and two for the reader for a given transducing head.

As areal recording density for HDDs increases, the sizes of sliders and transducing heads continue to decrease. Moreover, the track widths of individual concentric data tracks on HDD discs continue to decrease. Decreasing slider sizes and disc track widths present numerous difficulties. For example, with perpendicular recording heads, magnetization transitions are recorded on the magnetic medium (e.g., disc) by a trailing edge of the main pole. The shape of the pole tip of the main pole is projected and reproduced on the magnetic medium during the write process. However, unwanted overwriting (or side writing) at locations adjacent to a desired write location on a data track may occur due to changes in skew angle as the transducing head travels in an arc across the magnetic medium as the actuator arm and suspension pivot. This can cause adjacent track interference, resulting in off track erasure of transitions recorded on the magnetic medium, and ultimately leading to a degradation of bit error rate.

An area of the pole tip of the main pole of the write is directly related to the ability to induce magnetization in the magnetic media, and writability loss. Prior art transducing heads have utilized a single, symmetric, trapezoidally-shaped (or hexagonally-shaped) pole tip that has two opposed beveled or "skewed" side walls in order to reduce overwriting due to skew angle. These bevels may be configured to have a relatively large wall angle in order to reduce overwriting at large skew angles. However, such a double-bevel trapezoidal pole tip design results in a decreased area of the pole tip at the ABS, particularly with relatively high wall angles for the bevels, which generally reduces a magnetic field H along a trailing edge of the pole tip compared to a rectangular pole tip shape. This reduction of the area of the pole tip and the corresponding loss in writability is undesirable.

Thus, the present invention provides a slider assembly having an alternative transducing head configuration configuration.

SUMMARY

A transducing head for use with a storage medium rotatable about an axis includes first and second writers for writing to the storage medium. The first writer is configured for dedicated writing to a first radial region of the storage medium, and the second writer is configured for dedicated writing to a second radial region of the storage medium. The second radial region is located radially outward from the first radial region.

DETAILED DESCRIPTION

In general, the present invention provides a transducing head having a plurality of writers each capable of writing to an adjacent magnetic storage medium, such as a magnetic storage disc of a hard disc drive (HDD). A first of the writers is configured for dedicated writing to a first radial region of the magnetic storage medium, and a second of the writers is configured for dedicated writing to a second radial region of the magnetic storage medium. The first and second radial regions are arranged concentrically and adjacent to one another, and in one embodiment the second radial region is located radially outward from the first radial region. A pole tip of each writer can have at least one beveled sidewall along an air bearing surface (ABS) of the transducing head, which can help reduce overwriting due to skew angle as the transducing head sweeps and arc across the magnetic storage medium during operation. In one embodiment, a perimeter of each of the pole tips along the ABS has an asymmetric trapezoidal shape, with only a single beveled sidewall, and the pole tips of the first and second writer can be configured as mirror images of each other to improve operation within a given radial region of the magnetic storage medium. In another embodiment, a perimeter of each of the pole tips along the ABS has a parallelogram shape, and the pole tips of the first and second writer can be configured as mirror images of each other to improve operation within a given radial region of the magnetic storage medium. Shapes of the pole tips according to the present invention can help increase surface area of each pole tip at the ABS, which can help increase the ability of each writer to generate a magnetic field at the pole tip for writing to the magnetic storage medium while still helping to reduce overwriting due to skew angle. The writers can be arranged in a stacked configuration or in the same plane. A shield can be positioned between the first and second writers in order to magnetically decouple them. Additional features and benefits of the present invention will be appreciated in light of the description that follows.

Figure 1:
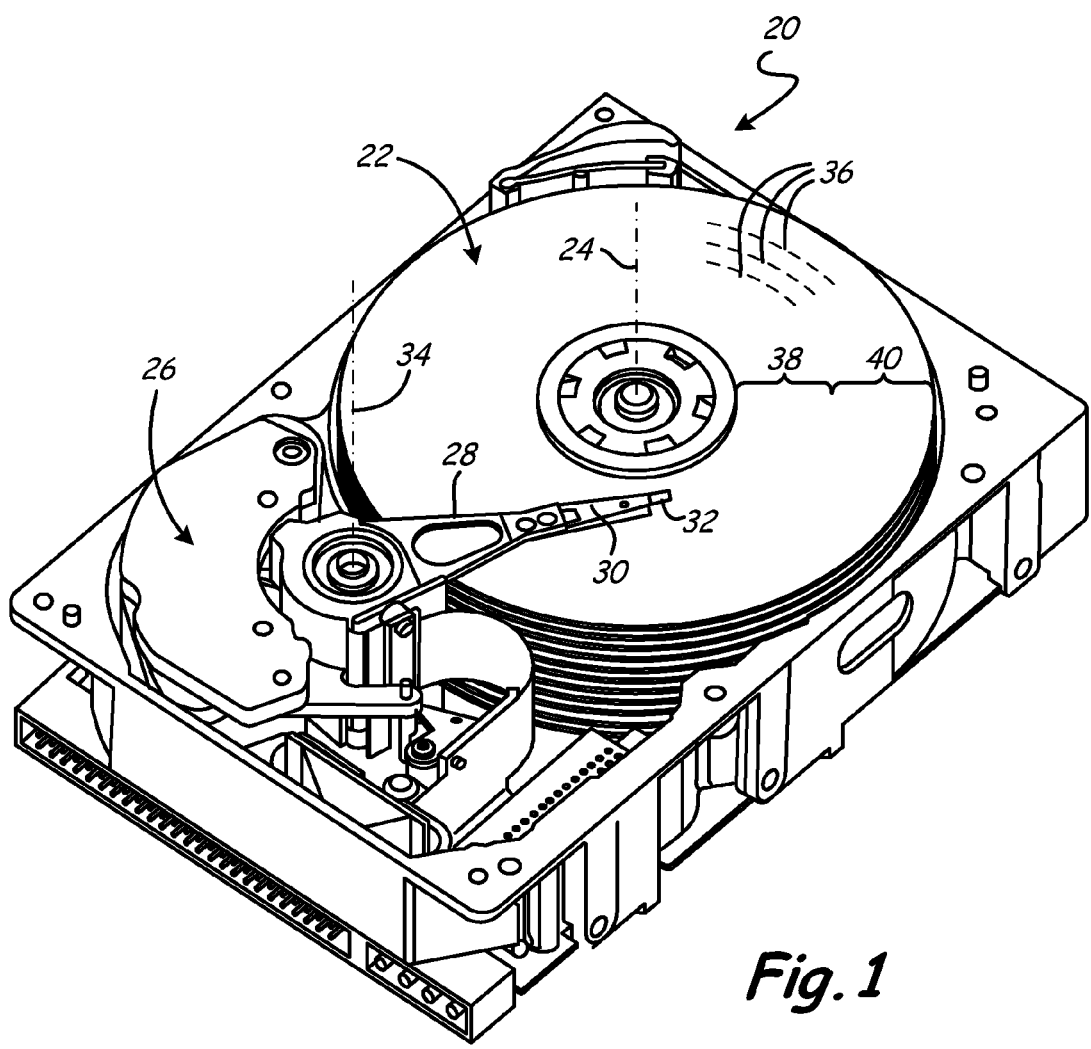
FIG. 1 is a perspective view of a hard disc drive system.

FIG. 1 is a perspective view of an exemplary HDD system 20 that includes a magnetic storage disc 22 configured to rotate about an axis 24, an actuation motor 26 (e.g., a voice coil motor), an actuator arm 28, a suspension assembly 30, and a slider 32 carrying a transducing head. The slider 32 is supported by the suspension assembly 30, which in turn is supported by the actuator arm 28. The actuation motor 26 is configured to pivot the actuator arm 28 about an axis 34, in order to sweep the suspension 30 and the slider 32 in an arc across a surface of the rotating disc 22 with the slider "flying" above the disc 22 on a cushion or air. An additional microactuation system can be provided for producing precise, small-scale movements of the suspension 30 and the slider 32. The transducing head carried by the slider 32 can be positioned relative to selected concentric data tracks 36 of the disc 22, for reading from and writing to the disc 22. It should be noted that a stack of co-rotating discs 22 can be provided, with additional actuator arms 28, suspension assemblies 30 and sliders 32 carrying transducing heads for reading and writing at top and bottom surfaces of each disc 22 in the stack.

As illustrated, each face of the disc 22 defines a number of concentric and adjacent radial regions relative to the axis 24, including an inner diameter (ID) region 38 and an outer diameter (OD) region 40. In one embodiment, the ID region 38 extends from a radially innermost extent of a writable surface of the disc 22 to the OD region 40, and the OD region 40 extends from the ID region 38 to substantially a radially outer edge (i.e., circumference) of the disc 22, though there can be a small unwritable region excluded from the OD region 40 at the radially outer edge of the disc 22. There are a plurality of the concentric data tracks 36 within both the ID region 38 and the OD region 40. It should be noted that as the actuator arm 28 and suspension 30 sweep the slider 32 in an arc to different radial locations of the disc 22 to read and write to selected data tracks 36, a skew angle of the transducing head carried by the slider 32 changes.

According to the present invention, the transducing head carries first and second writers, each dedicated for writing to either the ID region 38 or the OD region 40 of the disc 22. The writers can operate separately and independently from each other, with an appropriate one of the writers selected for operation as a function of the radial location of the particular data track 36 on the disc 22 where a writing operation is desired to be performed. The appropriate writer can then be powered for writing by suitable control circuitry, which can operate based on inferred or sensed positioning of the writers. As explained further below with respect to exemplary embodiments, each writer has a pole tip configured to address the particular skew angles presented by either the ID region 38 or the OD region 40 of the disc 22, while at the same time providing each pole tip with a relatively large surface area along the ABS.

Figure 2A:
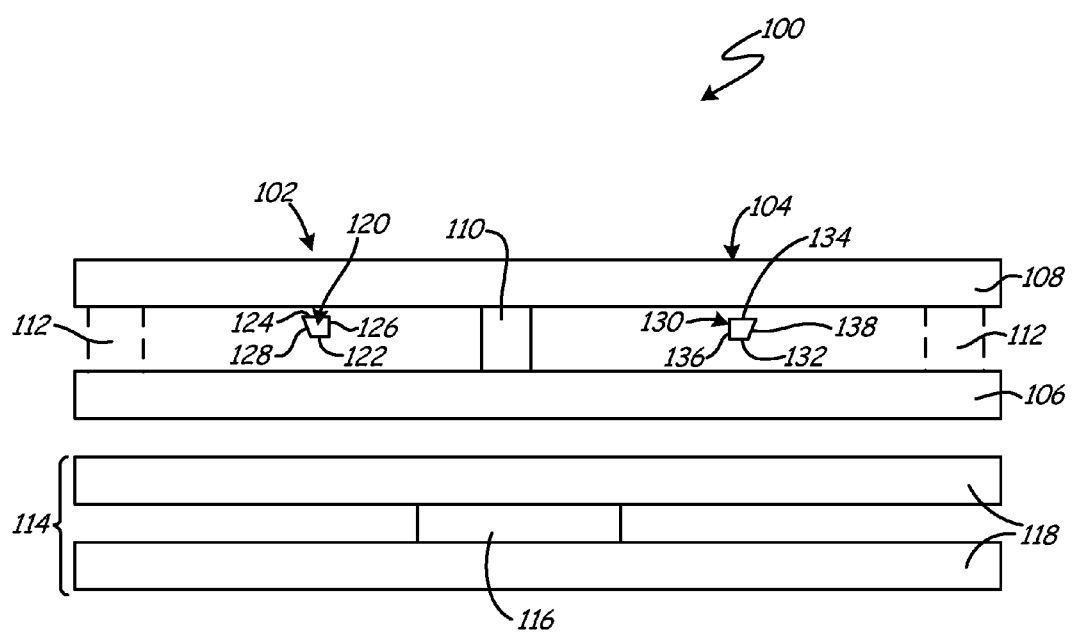
FIG. 2A is a plan view of a first embodiment of a transducing head according to the present invention, viewed from an air bearing surface.

FIG. 2A is a plan view of a first embodiment of a transducing head 100, viewed from an ABS. The transducing head 100 includes a first writer 102 for dedicated writing at a first region (e.g., the OD region 40) of the disc 22, a second writer 104 for dedicated writing at a second region (e.g., the ID region 38) of the disc 22, a first return pole 106, a second return pole (or front shield) 108, a shield 110, optional side shields 112 and a reader assembly 114. The reader assembly 114 includes a read sensor element 116 positioned between a pair of reader shields 118. In the illustrated embodiment, one of the reader shields 118 is positioned adjacent to and substantially parallel with the first return pole 106, and the read sensor element 116 is substantially aligned with the shield 110, in between the first and second writers 102 and 104.

The first writer 102 includes a main pole that defines a pole tip 120. In the illustrated embodiment, the pole tip 120 has an asymmetrical, trapezoidal shape along the ABS. A perimeter of the pole tip 120 is defined by a leading edge 122, a trailing edge 124, and two sidewalls 126 and 128. The leading and trailing edges 122 and 124 are arranged opposite one another and substantially parallel to each other. The sidewalls 126 and 128 are arranged opposite one another, in a non-parallel configuration with respect to each other, such that the sidewall 128 defines the beveled edge of the first writer 102. The sidewall 126 joins both the leading and trailing edges 122 and 124 at approximately right angles. The sidewall 128 is configured at a non-zero wall angle, for example at a 7.5°, 11°, 15° or other wall angle, which can vary as desired for particular applications. In this configuration, the pole tip 120 has a single bevel formed at the sidewall 128, which can be positioned at a radially outer location in the first writer 102 (relative to the axis 24) to help reduce overwriting due to skew angle during operation. Depending upon a tab location of the suspension assembly 30, the pole tip 120 can be configured for dedicated writing in either the ID region 38 or the OD region 40 of the disc 22.

The second writer 104 includes a main pole that defines a pole tip 130. In the illustrated embodiment, the pole tip 130 has an asymmetrical, trapezoidal shape along the ABS. A perimeter of the pole tip 130 is defined by a leading edge 132, a trailing edge 134, and two sidewalls 136 and 138. The leading and trailing edges 132 and 134 are arranged opposite one another and substantially parallel to each other. The sidewalls 136 and 138 are arranged opposite one another, in a non-parallel configuration with respect to each other, such that the sidewall 138 defines the beveled edge of the first writer 102. The sidewall 136 joins both the leading and trailing edges 132 and 134 at approximately right angles. The sidewall 138 is configured at a non-zero wall angle, for example at a 7.5°, 11°, 15° or other wall angle, which can vary as desired for particular applications. In this configuration, the pole tip 130 has a single bevel formed at the sidewall 138, which can be positioned at a radially inner location in the second writer 104 (relative to the axis 24) to help reduce overwriting due to skew angle during operation. Depending upon the tab location of the suspension assembly 30, the pole tip 130 can be configured for dedicated writing in either the ID region 38 or the OD region 40 of the disc 22, with the pole tips 120 and 130 configured for dedicated operation within different regions 38 and 40 of the disc 22.

In the illustrated embodiment, the pole tips 120 and 130 of the first and second writers 102 and 104 are configured as mirror images of each other across a plane defined through the shield 110 and perpendicular to the ABS. Thus, the wall angles of the beveled sidewall 128 of the pole tip 120 of the first writer 120 can be substantially the same at the wall angle of the beveled sidewall 138 of the pole tip 130 of the second writer 104. The use of the two writers 102 and 104 each dedicated for use within a selected region of the disc 22 allows each pole tip 120 and 130 to have only a single bevel, making them closer to being rectangular in shape than known double-bevel pole tip configurations. It should be noted that if a boundary where the ID region 38 and the OD region 40 meet falls within a data track 36, then that data track 36 is considered to be within both the ID and OD regions 38 and 40 and can be written to by a writer dedicated to either the ID region 38 or the OD region 40. Furthermore, the boundary between the ID region 38 and the OD region 40 can be a zero-skew point for a non-beveled transducing head, and any of the writers 102 or 104 can generally write to the disc 22 equally well at such a zero-skew point with an equally low risk of overwriting adjacent data tracks 36. It should also be noted that the read sensor element 116 can read from both the ID and OD regions 38 and 40, and can be positioned for reading from a given data track 36 on the disc 22 with the aid of a microactuation stroke suitable for the particular region of the disc 22 desired to be read.

The first and second return poles 106 and 108 are positioned adjacent to the respective leading and trailing edges of the pole tips 120 and 130, separated by an electrically insulating material. The first return pole 106 can be coupled to a yoke (not shown in FIG. 2A) through a leading back gap closer and the second return pole 108 can be coupled to the main poles of both writers 102 and 104 through a trailing back gap closer. In such a configuration, the first and second return poles 106 and 108 are shared by both the first and second writers 102 and 104, which typically would not operate simultaneously.

The shield 110 is positioned in between the pole tips 120 of the first and second writers 102 and 104, separated by the electrically insulating material. As illustrated in FIG. 2A, the shield 110 is connected between the first and second return poles 106 and 108. The shield 110 functions to magnetically decouple the pole tips 120 and 130 of the first and second writers 102 and 104, in order to reduce unwanted interference. Additionally, side shields 112 can optionally be provided adjacent to the beveled sidewalls 128 and 138 of the pole tips 120 and 130 of the first and second writers 102 and 104, separated by the electrically insulating material, and connected between the first and second return poles 106 and 108. The shield 110 and the side shields 112 can be coupled together.

Figure 2B:
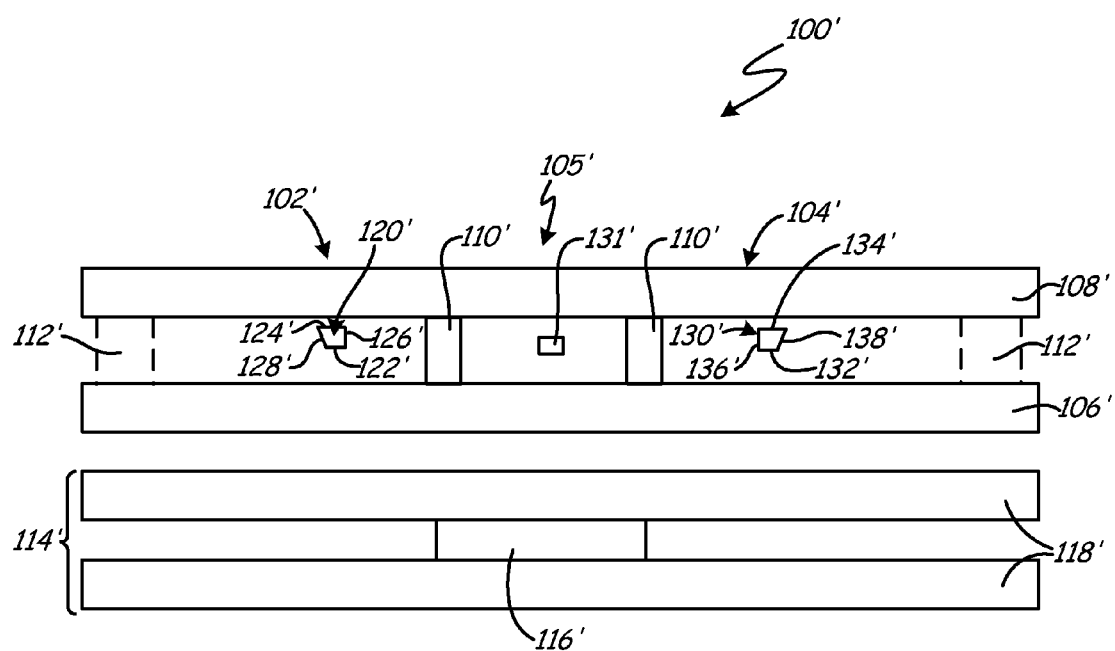
FIG. 2B is a plan view of a second embodiment of a transducing head according to the present invention, viewed from an air bearing surface.

FIG. 2B is a plan view of a second embodiment of a transducing head 100', viewed from an ABS. The transducing head 100' is generally similar to the transducing head 100 described above, and includes a first writer 102' for dedicated writing at a first region (e.g., the OD region 40) of the disc 22, a second writer 104' for dedicated writing at a second region (e.g., the ID region 38) of the disc 22, a third writer 105' for dedicated writing at a third region (e.g., a middle diameter region located in between the ID and OD regions 38 and 40) of the disc 22, a first return pole 106', a second return pole (or front shield) 108', shields 110', optional side shields 112' and a reader assembly 114'. The third writer 105' includes a pole tip 131' with a relatively low wall angle configuration. In the illustrated embodiment, the pole tip 131' of the third writer 105' defines a substantially rectangular perimeter. The third writer 105' can be configured for dedicated writing to a region of the disc 22 at or near a zero skew angle region (e.g., a middle diameter region) of the disc 22, where overwriting is not problematic and beveled pole tips would not significantly reduce overwriting. One of the shields 110' is positioned between the pole tips 120' and 131' of the first and third writers 102' and 105', and the other shield 110' is positioned between the pole tips 130' and 131' of the second and third writers 104' and 105'.

Figure 3A:
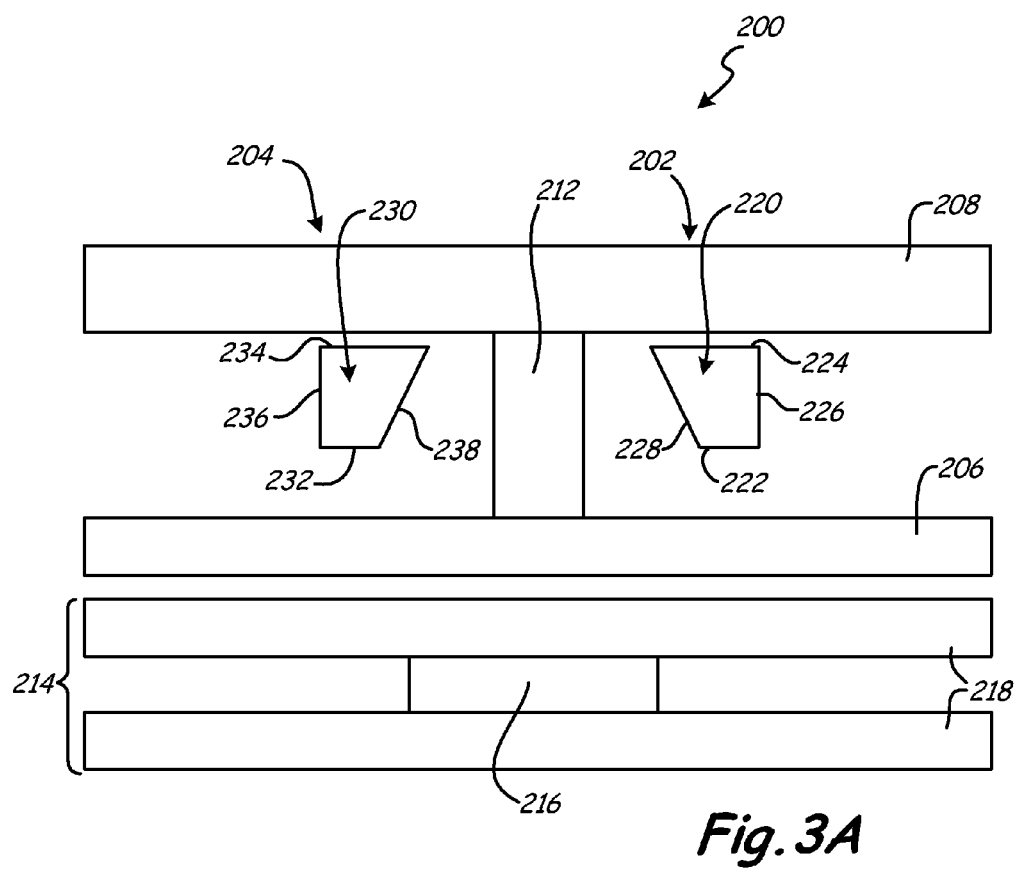
FIG. 3A is a plan view of a third embodiment of a transducing head according to the present invention, viewed from the air bearing surface.

FIG. 3A is a plan view of a third embodiment of a transducing head 200, viewed from the ABS. The third embodiment of the transducing head 200 is generally similar to the first embodiment of the transducing head 100 described above, and similar elements are designated by reference numbers having a value increased by one hundred in FIG. 3A. However, in the second embodiment of the transducing head 200, first and second writers 202 and 204 have switched positions (relative to the axis 24) compared to the first embodiment of the transducing head 100. A beveled sidewall 228 of a pole tip 220 of the first writer 202 is positioned to face a beveled sidewall 234 of a pole tip 230 of the second writer 204. As illustrated, a single side shield 212 having a substantially rectangular perimeter is positioned in between the first and second pole tips 220 and 230 and connected between first and second return poles 206 and 208.

Figure 3B:
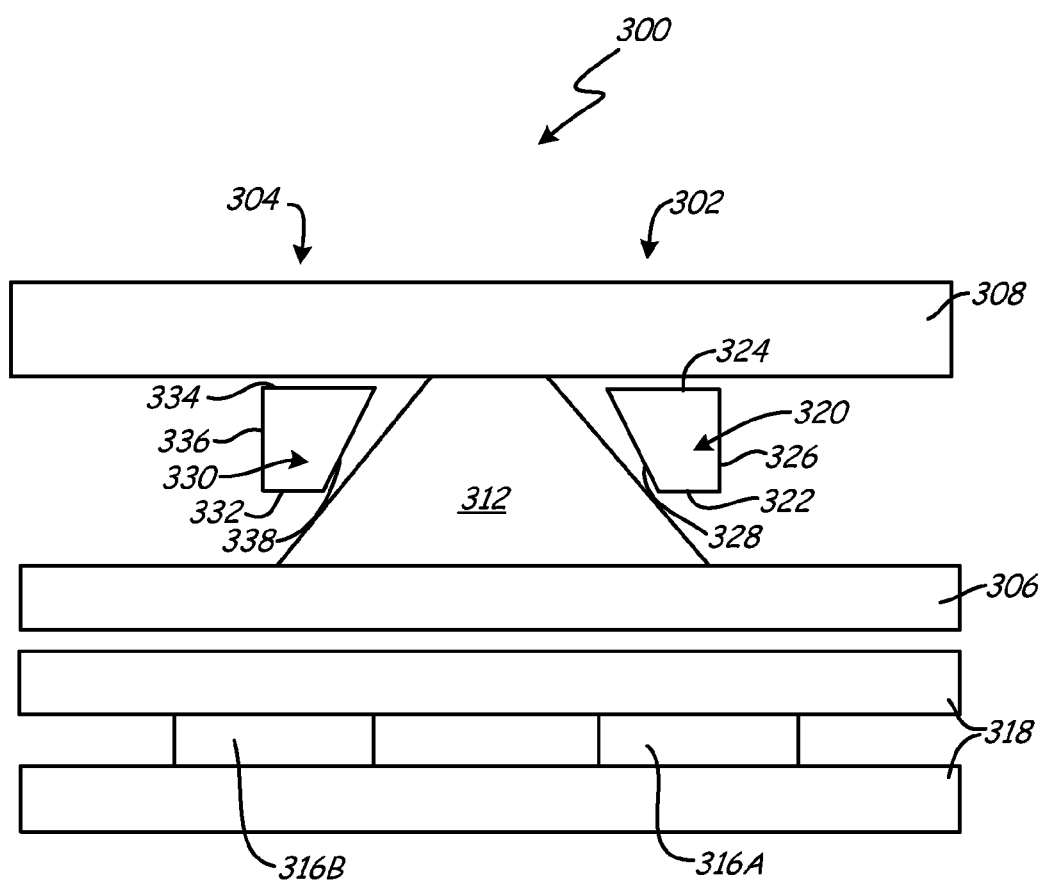
FIG. 3B is a plan view of a fourth embodiment of a transducing head according to the present invention, viewed from the air bearing surface.

FIG. 3B is a plan view of a fourth embodiment of a transducing head 300, viewed from the ABS. The fourth embodiment of the transducing head 300 is generally similar to the second embodiment of the transducing head 200 described above, and similar elements are designated by reference numbers having a value increased by one hundred in FIG. 3B. However, as illustrated in FIG. 3B, a single side shield 312 having a symmetrical, trapezoidal perimeter is positioned in between the first and second pole tips 320 and 330 and connected between first and second return poles 306 and 308. Side edges of the side shield 312 can be positioned at a different angle than a wall angle of beveled sidewalls 328 and 338 of pole tips 320 and 330, in other words, the side edges of the side shield 312 can be non-parallel with the beveled sidewalls 328 and 338.

Additionally, instead of a single read sensor element, the transducing head 300 includes two read sensor elements 316A and 316B aligned with the first and second writers 302 and 304, respectively. It should be noted that such a dual read sensor element configuration is not limited to the fourth embodiment shown in FIG. 3B, but can be applied with any embodiment of the present invention.

Figure 4:
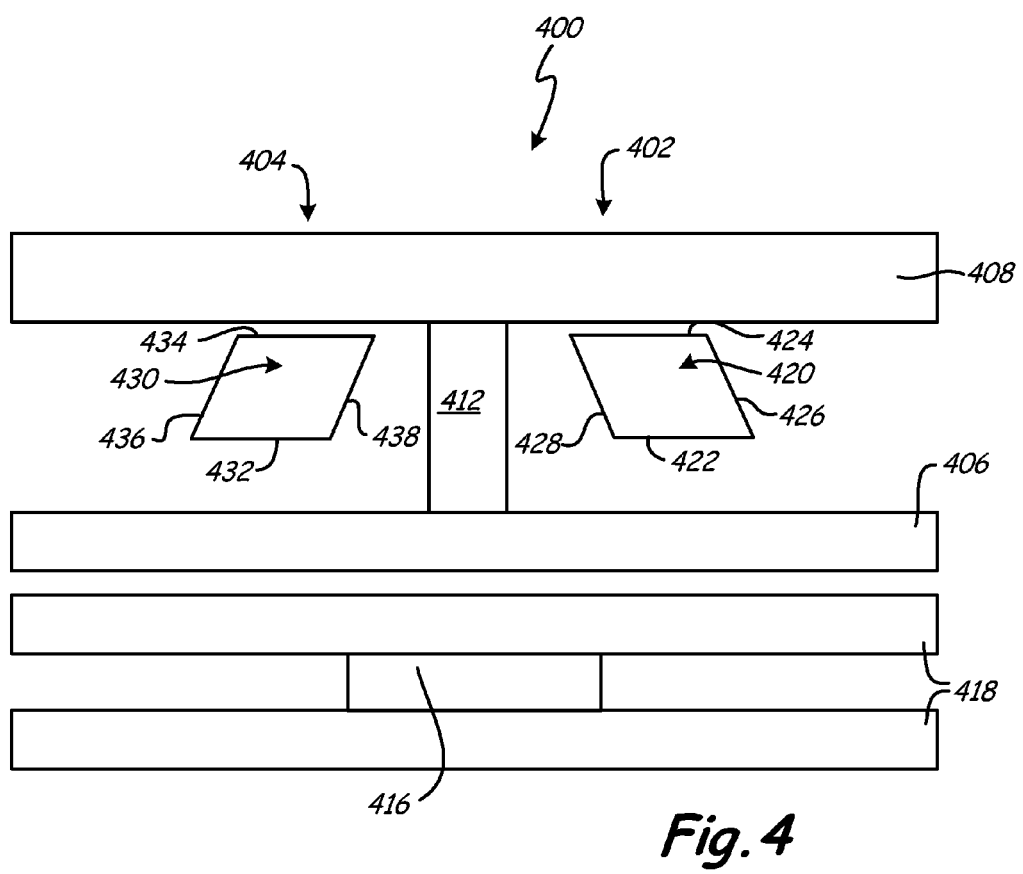
FIG. 4 is a plan view of a fifth embodiment of a transducing head according to the present invention, viewed from the air bearing surface.

FIG. 4 is a plan view of a fifth embodiment of a transducing head 400, viewed from the ABS. The fifth embodiment of the transducing head 400 is generally similar to the fourth embodiment of the transducing head 300 described above, and similar elements are designated by reference numbers having a value increased by one hundred in FIG. 4. However, the fifth embodiment of the transducing head 400 has a side shield 412 with a rectangular perimeter and one read sensor element 416. Furthermore, pole tips 420 and 430 of first and second writers 402 and 404 are different from the previously described embodiments. In the illustrated embodiment, the pole tips 420 and 430 of the first and second writers 402 and 404 are configured as mirror images of each other across a plane defined through the side shield 412 and perpendicular to the ABS.

In the illustrated embodiment, the pole tip 420 has a symmetrical, parallelogram shape along the ABS. A perimeter of the pole tip 420 is defined by a leading edge 422, a trailing edge 424, and two sidewalls 426 and 428. The leading and trailing edges 422 and 424 are arranged opposite one another and substantially parallel to each other. The sidewalls 426 and 428 are arranged opposite and substantially parallel to one another, such that the sidewall 428 defines a beveled edge of the first writer 402 and the sidewall 426 defines a reverse bevel. The sidewall 426 joins the trailing edge 424 at an obtuse included angle. The sidewall 428 is configured at a non-zero wall angle, for example at a 7.5°, 11°, 15° or other wall angle, which can vary as desired for particular applications. In this configuration, the pole tip 420 has a bevel formed at the sidewall 428, which can be positioned at a radially inner location in the first writer 402 (relative to the axis 24) to help reduce overwriting due to skew angle during operation within a particular region of the disc 22 (e.g., the OD region 40 of the disc 22). The reverse bevel formed at the sidewall 426 of the pole tip 420 helps to increase a surface area of the pole tip 420 at the ABS.

Moreover, in the illustrated embodiment, the pole tip 430 has a symmetrical, parallelogram shape along the ABS. A perimeter of the pole tip 430 is defined by a leading edge 432, a trailing edge 434, and two sidewalls 436 and 438. The leading and trailing edges 432 and 434 are arranged opposite one another and substantially parallel to each other. The sidewalls 436 and 438 are arranged opposite and parallel to one another, such that the sidewall 438 defines a beveled edge of the first writer 402 and the sidewall 436 defines a reverse bevel. The sidewall 436 joins the trailing edge 434 at an obtuse included angle. The sidewall 438 is configured at a non-zero wall angle, for example at a 7.5°, 11°, 15° or other wall angle, which can vary as desired for particular applications. In this configuration, the pole tip 430 has a bevel formed at the sidewall 438, which can be positioned at a radially outer location in the second writer 404 (relative to the axis 24) to help reduce overwriting due to skew angle during operation within a particular region of the disc 22 (e.g., the ID region 38 of the disc 22). The reverse bevel formed at the sidewall 436 of the pole tip 430 helps to increase a surface area of the pole tip 430 at the ABS.

Figure 5:
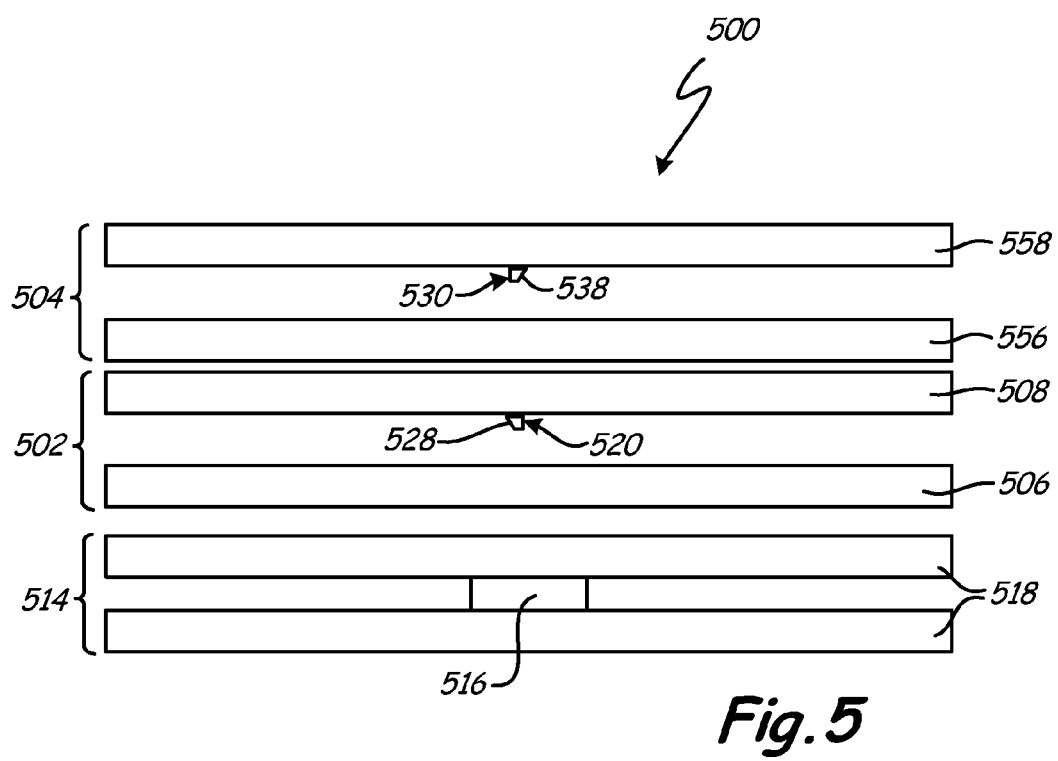
FIG. 5 is a plan view of a sixth embodiment of a transducing head according to the present invention, viewed from the air bearing surface.

FIG. 5 is a plan view of a sixth embodiment of a transducing head 500, viewed from the ABS. The sixth embodiment of the transducing head 500 is generally similar to the fifth embodiment of the transducing head 400 described above, and similar elements are designated by reference numbers having a value increased by one hundred in FIG. 5. However, the transducing head 500 includes a first writer 502 and a second writer 504 arranged in a stacked configuration with the first writer 502 located adjacent to a reader assembly 514. More particularly, the first writer 502 includes first and second return poles 506 and 508 and a main pole defining a pole tip 520 at the ABS that is positioned in between the first and second return poles 506 and 508. The second writer 504 includes third and fourth return poles 556 and 558 and a main pole defining a pole tip 530 at the ABS that is positioned in between the first and second return poles 556 and 558. The first return pole 506 of the first writer 502 is located adjacent to a shield 518 of the reader assembly 514, and the third return pole 556 of the second writer 504 is located adjacent to the second return pole 508 of the first writer 502. The pole tip 520 of the first writer 502 has an asymmetric, trapezoidally shaped perimeter and includes a single beveled sidewall 528. The pole tip 530 of the second writer 504 has an asymmetric, trapezoidally shaped perimeter and includes a single beveled sidewall 538. The pole tips 520 and 530 are configured as mirror images of each other, with the respective beveled sidewalls 528 and 538 arranged to face in opposite directions. As illustrated, the beveled sidewall 528 of the first writer 520 faces radially outward (with respect to the axis 24) for improved writing at the OD region 40 of the disc 22, and the beveled sidewall 538 of the second writer 504 faces radially inward (relative to the axis 24) for improved writing at the ID region 38 of the disc 22. Furthermore, the pole tips 520 and 530 are substantially aligned, that is, both are centered along lengths of the return poles 506, 508, 556 and 558. The stacked configuration of the transducing head 500 can help simplify positioning the first and second writers 502 and 504, because they are both aligned along with a read sensor element 516. However, the illustrated embodiment of the stacked transducing head 500 includes a greater number of return poles 506, 508, 556 and 558 than the in-plane configurations described above, which can be simpler to fabricate and can save space compared to the stacked configuration.

In alternative embodiments, the directions in which the beveled sidewalls 528 and 538 face can be reversed. In further alternative embodiments, positioning of the first and second writers 502 and 504 relative to the reader assembly 514 can be reversed. In other words, the second writer 504 can be positioned closer to the reader assembly 514 than the first writer 502 in an alternative embodiment.

Figure 6:
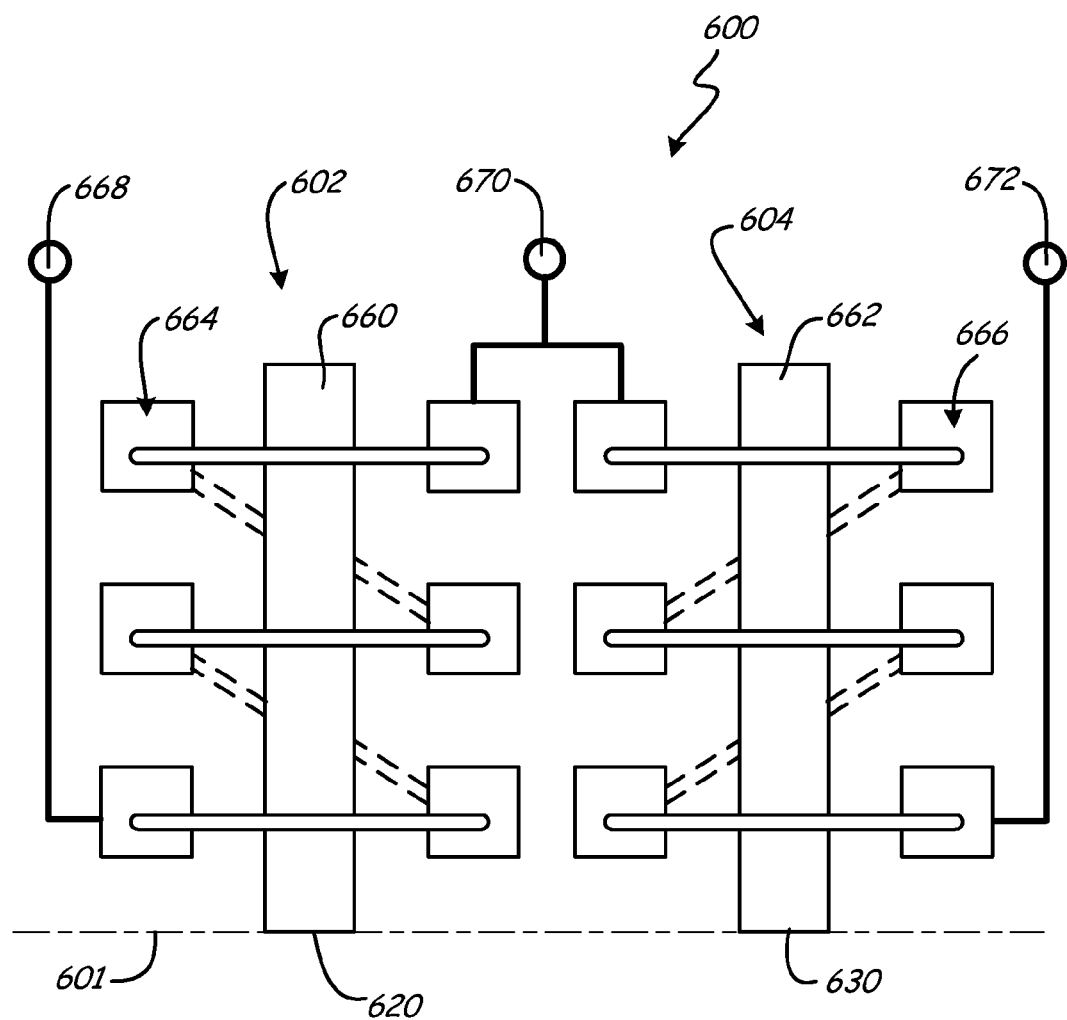
FIG. 6 is a schematic elevation view of twin writers of the transducing head, viewed perpendicular to the air bearing surface.

FIG. 6 is a schematic elevation view of twin writers of a transducing head 600, viewed perpendicular to an ABS 601. The transducing head 600 can have a configuration generally similar to any of the previously described embodiments, and more broadly, the features described with respect to the transducing head 600 are generally applicable to any embodiment of the present invention. The transducing head 600 includes a first writer 602 and a second writer 604 having pole tips 620 and 630, respectively, positioned along the ABS 601. The pole tips 620 and 630 are defined by respective first and second main poles 660 and 662 of the first and second writers 602 and 604. As illustrated, a first magnetization coil 664 is helically wound around the first main pole 660, and a second magnetization coil 666 is helically wound around the second main pole 662. It should be noted that the present invention is not limited to helical magnetization coil configurations. In alternative embodiments, the first and second magnetization coils 664 and 666 can have different configurations, such a pancake configurations.

The first magnetization coil 664 of the first writer 602 is electrically connected to a first terminal 668 and a second terminal 670. The second magnetization coil 666 of the second writer 604 is electrically connected the second terminal 670 and a third terminal 672. In this way, the second terminal 670 provides a "center tap" jointly electrically connected to both the first and second magnetization coils 664 and 666 of the first and second writers 602 and 604. This configuration is possible because the two writers 602 and 604 are configured to operate within dedicated regions of the disc 22, and therefore can operate separate and independent from each other with only one of the writers 602 or 604 operating at any given time. Use of the shared second terminal 670 can help save space and weight within the transducing head 600 by reducing the number of electrical traces and bonding pads required, which can further help to simplify fabrication of the transducing head 600. Additionally, the shared second terminal 670 can help reduce a size of a suitable preamp (not shown) used with the transducing head 600.

Figure 7:
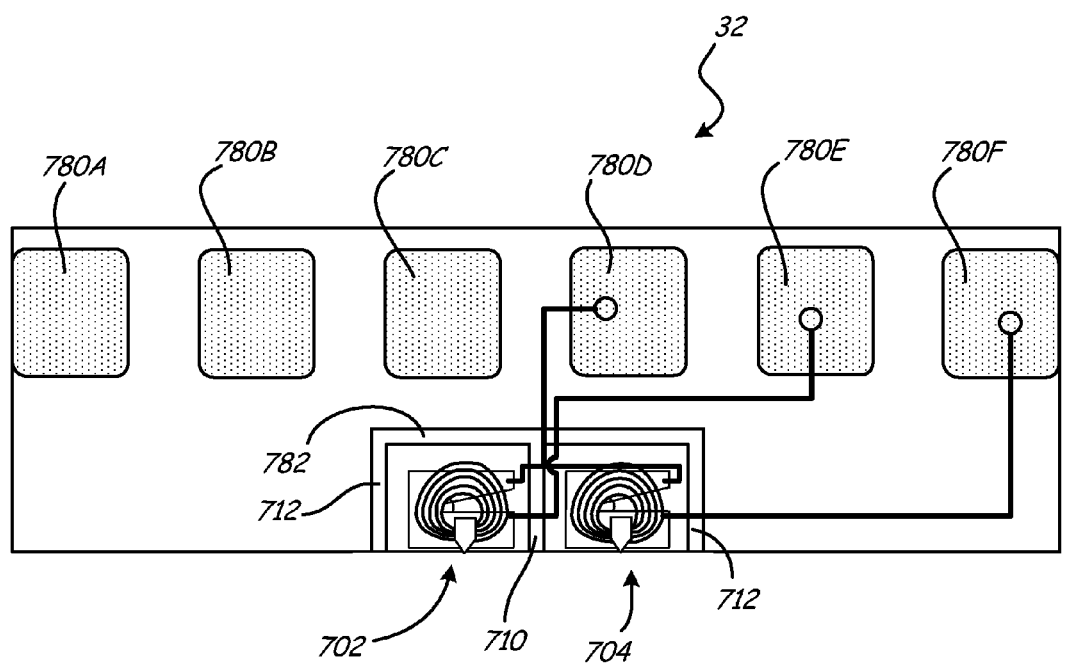
FIG. 7 is a schematic elevation view of a slider carrying a transducing head with twin writers, viewed from a trailing edge.

FIG. 7 is a schematic elevation view of a slider 32 carrying a transducing head 700 with first and second writers 702 and 704, viewed from a trailing edge. In the schematic view of FIG. 7, components of the transducing head are visible for illustrative purposes, though in actual embodiments they would typically not be visible at the trailing edge of the slider 32. The transducing head 700 can have a configuration generally similar to any of the previously described embodiments, and more broadly, the features described with respect to the transducing head 700 are generally applicable to any embodiment of the present invention. As illustrated, six bond pads 780A-780F are provided along the trailing edge of the slider 32. Magnetic coils (shown in a pancake configuration) of both the first and second writers 702 and 704 are commonly electrically connected to the bond pad 780D. Further, the magnetic coil of the first writer 702 is electrically connected to the bond pad 780E, and the magnetic coil of the second writer 704 is electrically connected to the bond pad 780F. The remaining bond pads 780A-780C can be utilized for electrical connection to other components of the transducing head 700 not shown in FIG. 7, such as one or more reader elements, heaters, etc.

Additionally, a shield 710 is positioned in between the first and second writers 702 and 704 for magnetically decoupling them, and side shields 712 are poisoned at the other sides of the first and second writers 702 and 704. A back via 782 couples the shield and the side shields 712 together, defining an E-shaped shield assembly.

Figure 8:
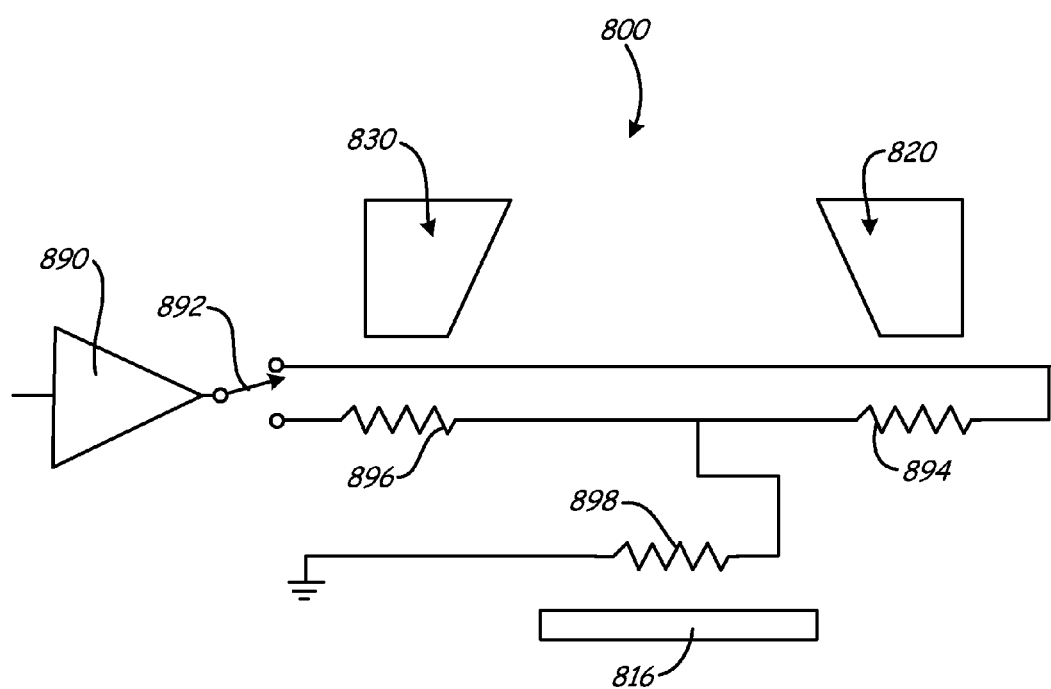
FIG. 8 is a schematic view of a heater system for the transducing head.

FIG. 8 is a schematic view of a heater system 800 for use with any embodiment of a transducing head of the present invention. The system 800 is configured relative to a read sensor element 816 and first and second writer pole tips 820 and 830. The system 800 includes a heater driver 890 (e.g., amplifier), a two-way switch 892, and resistive heaters 894, 896 and 898. The heater 898 is positioned adjacent to the read sensor element 816 and is electrically connected between the switch 892 and ground. The heater 894 is positioned adjacent to the first pole tip 820 and is electrically connected between a first pole of the switch 892 and the heater 898. The heater 896 is positioned adjacent to the second pole tip 830 and is electrically connected between a second pole of the switch 892 and the heater 898. During operation, the switch 892 can be used to provide heat to either (a) the first pole tip 820 and the read sensor element 816 or (b) the second pole tip 830 and the read sensor element 816.

In an alternative embodiment, two read sensor elements 816 can be provided, and an additional resistive heater can be provided in the heater system 800 adjacent to the additional read sensor element. In this alternative embodiment, the heaters for the read sensor elements can be separately activated, for instance, one can be electrically connected between the heater 894 and ground and the other can be electrically connected between the heater 896 and ground for selective activation by the switch 892.

Figure 9A:
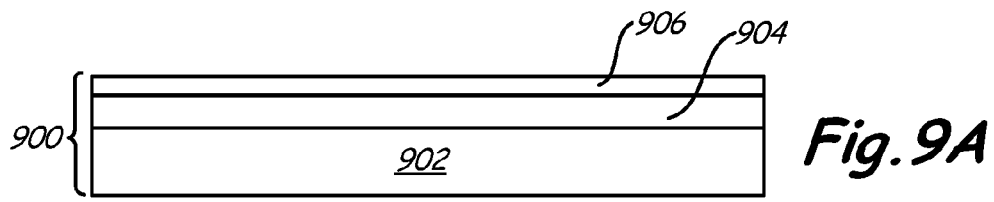
FIGS. 9A-9F are plan views of the transducing head at various stages during fabrication, viewed from the air bearing surface.
Figure 9B:
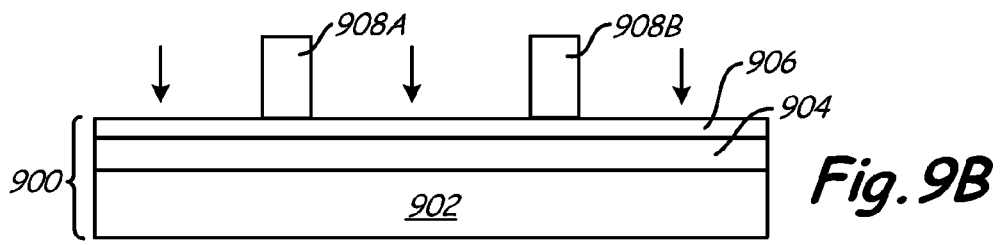
Figure 9C:
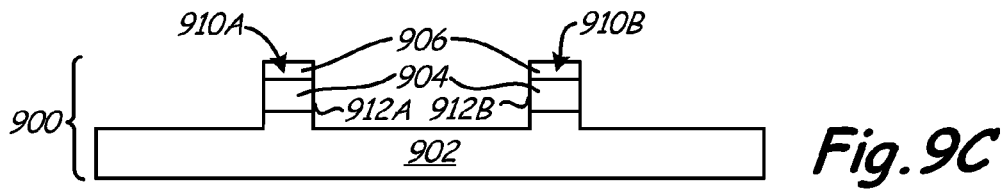

FIGS. 9A-9F are plan views of a transducing head of the present invention at various stages during fabrication, viewed from an ABS. In FIG. 9A, a multi-layer substrate 900 is formed that includes a base layer 902 (e.g., alumina), a yoke layer 904 placed on the base layer 902, and a high moment writer pole sheet 906 placed upon the yoke layer 904. Next, as shown in FIG. 9B, a hard mask of photoresist material is applied to the writer pole sheet 906 in a desired pattern. In the illustrated embodiment, photoresist material includes a first portion 908A and a second portion 908B. A conventional ion milling or other etching process is then performed, removing material of the multi-layer substrate 900 and transferring the pattern defined by the photoresist material (e.g., first and second portions 908A and 908B). This ion milling or other etching process is performed, for instance, to provide ion bombardment substantially perpendicular to the multi-layer substrate 900. Any residual photo resist material is then stripped. As shown in FIG. 9, ion milling or other etching process defines a first feature 910A and a second feature 910B in the multi-layer substrate 900. The first feature 910A includes a substantially planar face 912A, and the second feature 910B includes a substantially planar face 912B. The substantially planar faces 912A and 912B can be arranged to face each other.

Figure 9D:
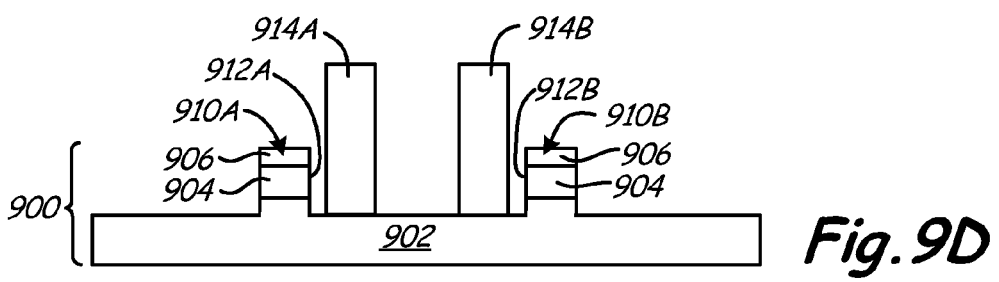
Figure 9E:
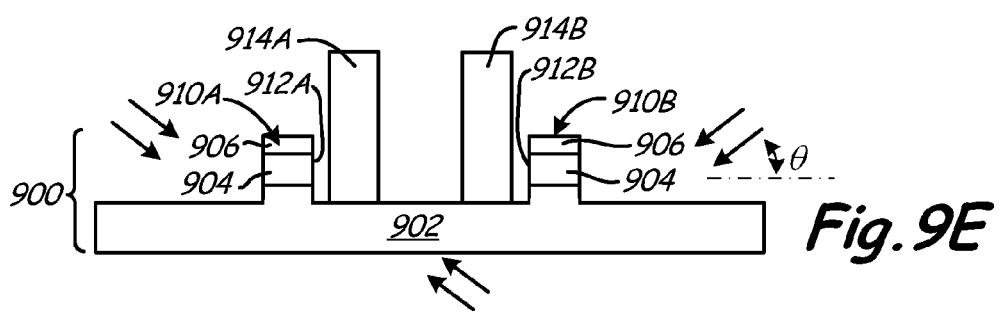
Figure 9F:
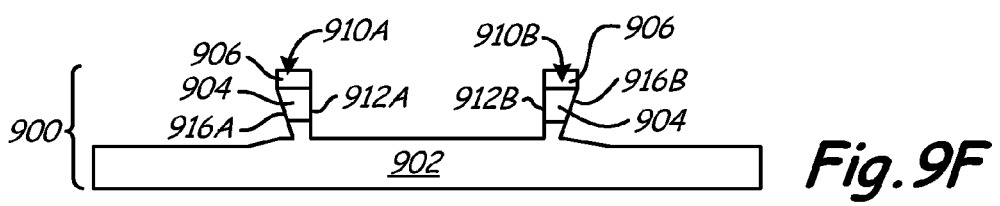

Next, as shown in FIG. 9D, tall photo resist features, called shadowing walls 914A and 914B, are deposited on the multi-layer substrate 900 adjacent to the respective substantially planar faces 912A and 912B of the first and second features 910A and 910B. In the illustrated embodiment, the shadowing walls 914A and 914B are both positioned in between the first and second features 910A and 910B in the multi-layer substrate 900. The shadowing walls 914A and 914B can be positioned in close proximity to but spaced from the substantially planar faces 912A and 912B, respectively. The shadowing walls 914A and 914B can be taller (i.e., greater in height) than the first and second features 910A and 910B. Another ion milling or other etching process is then performed. As shown in FIG. 9E, ion milling bombardment is performed in a conventional manner at a glancing milling angle θ, for instance, using rotational −70° ion milling with an ion beam mill (e.g., a "NEXUS IBE" ion beam mill available from Veeco, Painview, N.Y.). During the ion milling or other etching process performed at the glancing milling angle θ the shadowing walls 914A and 914B provide protection to the substantially planar faces 912A and 912B of the first and second features 910A and 910B, respectively. As shown in FIG. 9F, any residual photoresist material can then be stripped, and beveled sidewalls 916A and 916B are defined in the first and second features 910A and 910B, respectively, in the multi-layer substrate 900. In the illustrated embodiment, the beveled sidewall 916A is located at an opposite face of the first feature 910A from the substantially planar face 912A, and the beveled sidewall 916B is located at an opposite face of the second feature 910B from the substantially planar face 912B. Thus, trapezoidally-shaped features (e.g., writer pole tips)

can be formed in one or more layers of the multi-layer substrate 900 in the first and second features 910A and 910B.

It should be noted that greater or fewer features can be formed in the multi-layer substrate 900 as desired. Also, additional processing steps not specifically mentioned can also be performed, as desired for particular applications. Moreover, the manufacturing method described above can be repeated sequentially to form features in a stacked configuration.

Although the present invention has been described with reference to preferred embodiments, workers skilled in the art will recognize that changes may be made in form and detail without departing from the spirit and scope of the invention. For example, pole tip configurations according to the present invention can be applied to nearly any transducing head writer design. Moreover, the particular size, wall angles, and other details of a given pole tip can vary as desired for particular applications. In addition, further embodiments of the present invention can include additional writers each dedicated to one of a corresponding number of additional writable regions of a magnetic storage medium.

The invention claimed is:

1. A transducing head for use with a storage medium, the transducing head comprising:
   a first writer configured for dedicated writing to a first radial region of a surface of the storage medium;
   a second writer configured for dedicated writing to a second radial region of the surface of the storage medium, the second radial region located radially outward from the first radial region; and
   a shield shaped with a substantially trapezoidal perimeter and positioned between the first and second writers for magnetically decoupling the first and second writers.

2. The transducing head of claim 1, wherein respective pole tips for the first and second writers each comprise a beveled edge along an air bearing surface of the transducing head.

3. The transducing head of claim 2, wherein the beveled edge of the pole tip of the first writer is located at a radially outer portion of a perimeter of the pole tip relative to the axis.

4. The transducing head of claim 2, wherein each of the first and second writers has a parallelogram-shaped perimeter along the air bearing surface.

5. The transducing head of claim 2, wherein profiles of the first and second writers along the air bearing surface are mirror images of one another across a plane positioned between the first and second writers and perpendicular to the air bearing surface.

6. The transducing head of claim 2, wherein each of the first and second writers has a trapezoidal perimeter along the air bearing surface.

7. The transducing head of claim 6, wherein the trapezoidal perimeter of the first writer is defined by first, second, third and fourth edges, wherein the first and second edges are arranged opposite one another and parallel to each other, and wherein the third and fourth edges are arranged opposite one another, wherein the third and fourth edges are non-parallel to each other, and wherein the third edge defines the beveled edge of the first writer.

8. The transducing head of claim 6, wherein the trapezoidal perimeter of the first writer is asymmetrical.

9. The transducing head of claim 1 and further comprising:
   a first return pole;
   a second return pole, wherein the second writer is positioned between the first and second return poles;
   a third return pole; and
   a fourth return pole, wherein the first writer is positioned between the third and fourth return poles, and wherein the third return pole is positioned adjacent to the second return pole.

10. The transducing head of claim 9, wherein the first writer is positioned between the first and second poles.

11. The transducing head of claim 1 and further comprising:
    a heater system comprising:
      a heater driver;
      a switch electrically connected to the heater driver and having first and second poles;
      a first reader heater electrically connected to ground;
      a first writer heater electrically connected between the first pole of the switch and the first reader heater; and
      a second writer heater electrically connected between the second pole of the switch and the first reader heater.

12. The transducing head of claim 1 and further comprising:
    a first electrical connection pad electrically connected to the first writer;
    a second electrical connection pad electrically connected to the second writer; and
    a third electrical connection pad electrically connected to both the first and second writers.

13. The transducing head of claim 1 and further comprising:
    a third writer for writing to the storage medium, wherein the third writer is configured for dedicated writing at or near a zero skew region of the storage medium.

14. A transducing head for use with an adjacent magnetic storage medium, the transducing head comprising:
    a first writer having a pole tip with a trapezoidal perimeter along an air bearing surface that faces the magnetic storage medium;
    a second writer having a pole tip with a trapezoidal perimeter along the air bearing surface, the first and second writers adapted to concurrently program different data bits with separate magnetization coils wound about the first and second writers, respectively; and
    a third writer shaped with a substantially rectangular perimeter positioned between the first and second writers.

15. The transducing head of claim 14, wherein the trapezoidal perimeter of the first writer is defined by first, second, third, and fourth edges, wherein the first and second edges are arranged opposite one another and substantially parallel to each other, and wherein the third and fourth edges are arranged opposite to one another, wherein the third and fourth edges are non-parallel to each other, and wherein the fourth edge meets each of the first and second edges at an approximately 90° angle.

16. The transducing head of claim 14, wherein profiles of the first and second writers along the air bearing surface are mirror images of one another across a plane positioned between the first and second writers a perpendicular to the air bearing surface.

17. The transducing head of claim 16, wherein the trapezoidal perimeter of the second writer is define by first, second, third and fourth edges, wherein the first and second edges are arranged opposite one another and substantially parallel to each other, wherein the third and fourth edges are arranged opposite to one another, wherein the third and fourth edges are non-parallel to each other, and wherein the fourth edge meets each of the first and second edges at an approximately 90° angle.

18. The transducing head of claim 14, wherein the first and second writers are configured to write to the storage medium independent of one another and each within a dedicated radial region of the storage medium.

19. The transducing head of claim 14 and further comprising:
   a shield positioned between the first and second writers for magnetically decoupling the first and second writers.

20. The transducing head of claim 14 and further comprising:
   a first electrical connection pad electrically connected to the first writer;
   a second electrical connection pad electrically connected to the second writer; and
   a third electrical connection pad electrically connected to both the first and second writers, the third electrical connection pad configured to allow independent and concurrent operation of the first and second writers.

21. The transducing head of claim 14 and further comprising:
   a third writer having a pole tip, wherein the pole tip of the third writer defines a rectangular perimeter along the air bearing surface.

22. A transducing head comprising:
   an air bearing surface;
   a first writer comprising:
      a pole tip having a trapezoidal perimeter along the air bearing surface, and
   a second writer comprising:
      a pole tip having a trapezoidal perimeter along the air bearing surface, wherein the trapezoidal perimeter of the pole tip of the second writer is configured as a mirror image of the trapezoidal perimeter of the pole tip of the first writer, the first and second writers each positioned between first and second return poles.

* * * * *